Feb. 7, 1950 C. N. GILLESPIE 2,496,788
PHASING APPARATUS
Filed Sept. 10, 1946
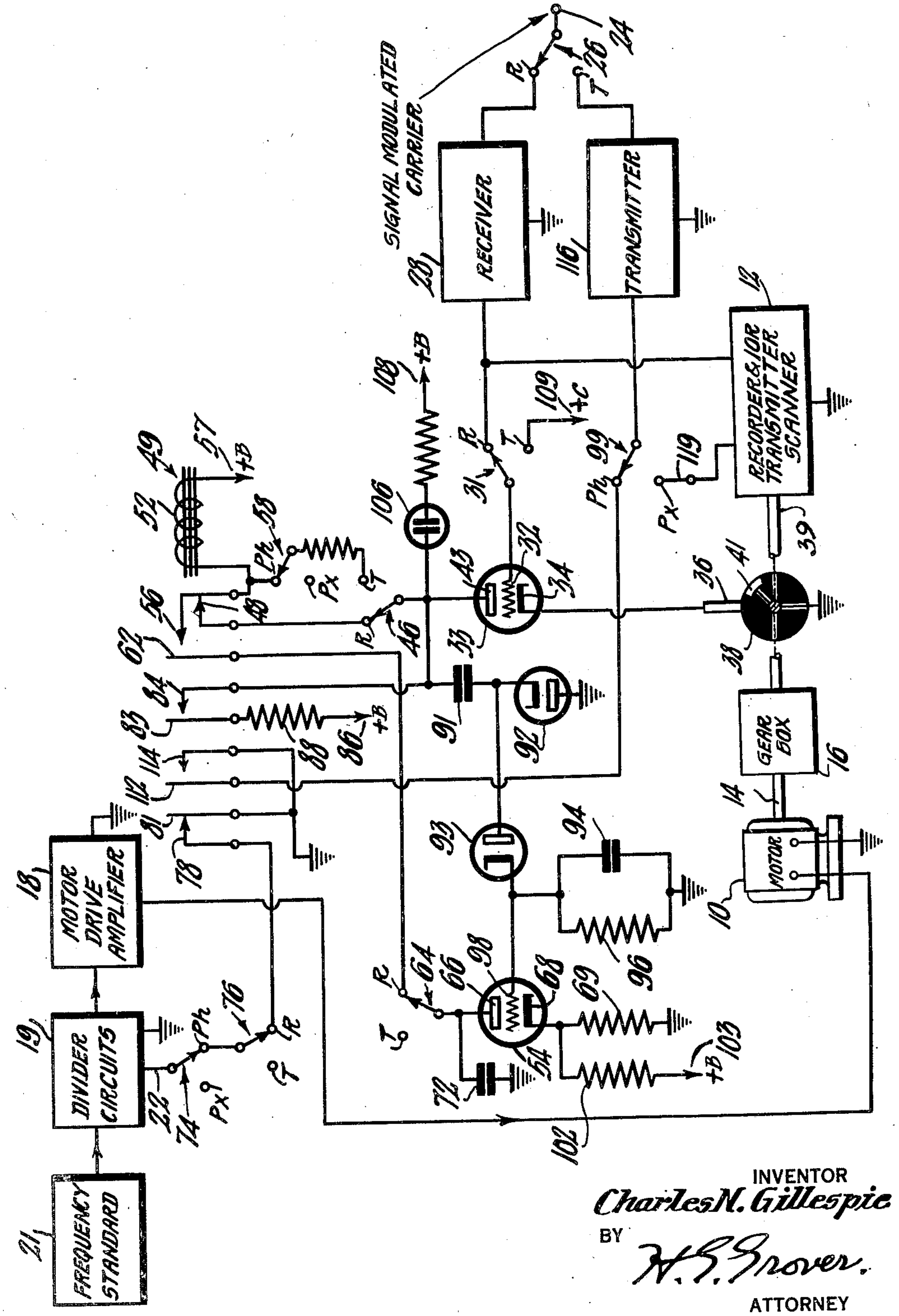
INVENTOR
Charles N. Gillespie
BY H. S. Grover.
ATTORNEY Patented Feb. 7, 1950 2,496,788

UNITED STATES PATENT OFFICE 2,496,788

PHASING APPARATUS

Charles N. Gillespie, Waltham, Mass., assignor to Radio Corporation of America, a corporation of Delaware Application September 10, 1946, Serial No. 695,894

5 Claims. (Cl. 178—69.5)

The present invention relates to phasing apparatus and phasing circuits and, more particularly, but not necessarily exclusively, to the phasing of the drive means for facsimile equipment, such as a facsimile recorder.

In facsimile systems generally, a moving part of a facsimile recorder, such as the copy holding drum, must operate co-phaseally with the corresponding part of the transmitter scanner. The principal aim of the present invention is to provide novel means for automatically accomplishing phasing of a moving part of the facsimile recorder with a corresponding part of a facsimile transmitter.

In accordance with the invention a prime mover, such as a driving motor for the apparatus to be phased, is operated at a speed other than its normal speed until accurate phasing is obtained, whereupon this "in phase" condition is maintained. In accordance with the invention these functions are accomplished automatically.

Another object of the invention is to provide electronic means for performing a phasing operation incident to the phasing of one moving part with another moving part.

A further object of the invention is to provide a novel locking circuit in a control relay.

Other objects of the invention will appear from the following description, reference being had to the accompanying drawing which shows, schematically, phasing apparatus arranged to function in accordance with the invention.

Referring now to the single figure of the drawing, there is shown diagrammatically the essential parts of a facsimile or photo-radio station which may serve either as a transmitting station or as a receiving station. When the equipment is operated to receive a facsimile signal and produce a record therefrom, reception may be had, it will be understood, from any type of transmitting equipment which is capable of producing phasing signals when the receiving equipment is to be phased. For the sake of convenience of description, it will be assumed that the transmitting station from which reception is to be had will be the same as that shown in the drawing with the switches or other equivalent control devices set to the "transmitting" position. Suitable transmitting and recording scanners, which are by now well known in the art, may be employed since the invention is not concerned with the details of image signal generation or reception. Suitable arrangements for generating and receiving an image signal are disclosed in United States Patent No. 2,257,282 granted to J. E. Smith et al. on September 30, 1941.

It will be assumed that the apparatus shown in the drawing is to be placed in operation as a receiving station in preparation for recording image signals. As stated above since the facsimile apparatus per se does not form part of the present invention, it is shown only fragmentarily and diagrammatically and comprises a driving motor 10 which drives the mechanical parts of a recorder and/or a transmitter scanner 12 through a drive shaft 14 and a speed reducing mechanism 16. The apparatus, designated by the reference character 12, will be referred to as a recorder when the system of the drawing is in use as a receiving station. The motor 10 is preferably of the synchronous type so that it will operate precisely in step with the supply frequency. It will be understood, however, that the motor 10 may be an auxiliary and that the principal mechanical load may be taken by another motor. The motor 10 is connected to a motor drive amplifier 18, the latter being connected through a frequency divider 19 to a source of standard frequency 21. As will hereinafter appear, the frequency divider 19 serves to divide the output of the frequency standard 21 on two different scales or by two different numbers. A frequency divider suitable for the purpose is disclosed and claimed in the copending application of Arthur E. Canfora, Serial No. 696,013, filed September 10, 1946. The frequency division is altered by the internal circuits of the divider 19 upon grounding a connection 22. It will be understood that the standard frequency source 21 may be caused to change its generating frequency under control of the relay 49 to be described. The system of the invention may then be made to function without the divider circuits 19. In the illustrative example, the standard source 21 and the divider 19 constitutes, for purposes of this invention, a power source, the frequency of which may be changed.

The incoming signal is applied to a terminal 24 which is connected to the switch arm of a "transmit-receive" switch 26. The signals applied to the terminal 24 may be obtained from a transmission line, a carrier current circuit, or it may be the output from a radio receiver. These signals initially will consist of a carrier, for example, modulated by phasing pulses, one for each revolution of the scanner drum at the transmitter or its equivalent part. The received carrier is passed through a receiver 28 with switch 26 in the "R" position shown and the demodulated phasing pulses are applied to the "receive" point of a switch 31. The arm of this switch is connected to the grid 32 of a vacuum tube 33 and the system is so arranged that the tube 33 is normally cut-off by the received phasing signal except for the instant when the phasing pulse occurs. The cathode 34 of the tube 33 is connected to a brush 36 which bears on an insulating commutator 38 having a conducting segment 41. The conducting segment 41 is connected to ground, for example, through a shaft 39 and its angular position is angularly related to a phasing mark or the like on the recorder, copy holder or drum. The plate or anode 43 of the tube 33 is connected to the switch arm of a "transmit-receive" switch 46. The "receive" point R of this switch is connected to a break contact 48 of a relay indicated generally by the reference character 49. This relay may be any suitable single current relay, the operating coil 52 of which will cause the relay to respond when plate current from the tube 33 passes through it. Coil 52 also must be designed to serve as a locking coil when it carries plate current of a tube 54, the function of which will later be described. One terminal of the coil 52 is connected to a "make" contact 56 of the relay 49 and it is also connected to the phasing point P*h* of a phasing switch 58. The other terminal of the coil 52 is connected to the positive pole 57 of a source of plate current (not shown) for the tube 33. The make contact 56, the break contact 48, and a contact tongue 62 of the relay 49 constitute a make-before-break arrangement. When the relay is energized in a manner to be described, the tongue 62 engages the make contact 56 before the arm of the contact 56 is withdrawn from conductive engagement with the break contact 48.

The contact tongue 62 of the relay is connected to the "receive" contact R of a transmit-receive switch 64, the switch arm of which is connected to the plate 66 of the tube 54. The cathode 68 of the tube 54 is connected to ground through a resistor 69. The switch arm of the switch 64 is also connected to one terminal of a relatively large condenser 72, the other terminal of which is grounded. The circuit just described, including the condenser 72, serves as a holding or locking circuit for the relay 49. The contacts 48 and 56 and the relay contact tongue 62 serve as transfer contacts upon energization of the relay.

The previously mentioned connection 22 for the frequency divider 19 is connected to the switch arm of a phasing switch 74. The phasing point P*h* of the switch 74 is connected to the switch arm of a "send-receive" switch 76. The receiving point R of this switch is connected to a break contact 78 of the relay 49 which cooperates with a grounded relay tongue 81. This last described connection provides for raising the frequency of the supply source for the motor 10 which causes an increase in motor speed while the relay 49 is de-energized. This is because the motor supply is from the amplifier 18 which is initially energized from the frequency divider circuits 19 in the illustrative example of a system embodying the invention. With the relay energized, the frequency returns to the established standard frequency which keeps the motor in synchronism with the transmitter motor, or an equivalent moving part of the transmitter.

The contact tongue 83 of the relay 49 engages a make contact 84 when the relay is energized to connect a plate supply source 86 through a resistor 88 to the plate 43 of the tube 33. The plate supply source 86 may be the source 57 to which the relay coil 52 is connected.

A condenser 91 and a diode 92 are connected in series between ground and the plate 43 of the tube 33. A branch circuit comprising a diode 93 in series with a parallel combination of a condenser 94 and a high resistor 96 is shunted around the diode 92. The resistance value of the resistor 96 is very high to provide a long time constant in the R. C. circuit composed of the resistor 96 and the condenser 94. The condenser 94 will, therefore, hold the charge which is applied to it in the manner to be described and will maintain the grid 98 of the tube 54 positive.

Operation of the system of the invention for phasing the recorder 12 in preparation for a recording operation will now be described. The several switches will be in the receive-phase position as shown. In this connection it will be understood that the transmit-receive switches 26, 31, 46 and 76 may be in the form of single switch structure or they may be simultaneously operated. This also applies to the previously mentioned phasing switches 74, 58 and the phasing switch 99. The tube 33 is cut off and assuming that the motor 10 or the connected recorder 12 is out of phase, the relay 49 is de-energized as shown and the lead 22 from the frequency divider 19 is grounded through the tongue 81 and back contact 78 of the relay. This causes the frequency divider 19 to divide by a smaller number, as explained in the mentioned Canfora application, for example, to which reference is made for the sake of illustration and of brevity of this disclosure, thus driving the motor 10 at a faster speed. As stated above, other means, not forming a part of the present invention may be used under control of the relay 49 to alter the frequency of the supply source. When the receiving drum catches up with the transmitter from which phasing pulses originate, the cathode 34 of the tube 33 will be grounded through the segment 41 of the commutator 38 at the same instant that the positive phasing pulse is applied to its grid 32 and the tube 33 will conduct.

The plate current of the tube 33 will flow through the winding 52 of the relay 49 via the contacts 56 and 48, thus actuating the relay and opening the contacts 78 and 81 to remove ground from the connection 22. In accordance with the Canfora application referred to above, this causes the divider 19 to divide by its normal number. This is in effect, the same as causing the frequency standard 21 to provide power at a lower frequency. As a result of this, the motor 10 will operate in synchronism with the transmitter and the receiving drum or its equivalent part in the recorder 12 will be in phase with the transmitter.

The relay 49 will lock up on contacts 48 and 62 and coil current will be supplied by the large capacitor 72 until the tube 54 is actuated. The plate 43 of the tube 33 will be disconnected from the relay coil 52 when the relay contacts 56 and 48 open. The B supply 86 will be connected to the plate 43 through the resistor 88 via the relay contacts 84 and 83. The first positive pulse on the grid of the tube 33 after the system phases will cause a negative pulse to appear on its plate and this negative pulse puts a charge on the capacitor 91 via the diode 92. After the duration of the phasing pulse, the plate of the tube 33 goes more positive toward B+ through the resistor 88. This positive voltage change is coupled through the capacitor 91 and the diode 93 to the capacitor 94. This causes positive voltage to appear across the capacitor 94 which is applied to the grid 98 of the tube 54. The tube 54 is normally cut-off by the cathode bias supplied by the resistor 69 and another resistor 102. The resistor 102 is connected to a positive supply source 103. When the tube 54 conducts its supplies the holding current for the coil 52 of the relay 49.

As long as the recorder 12 remains in phase, pulses will be applied to the R. C. circuit 94 and 96 to maintain its positive voltage on the grid 98 of the tube 54, and thus hold the relay 49 closed. The long time constant of the R. C. circuit 94 and 96 will insure that the relay holds up while the recorder 12 is in phase.

The pulses which are in effect applied to the R. C. circuits 94 and 96 cause a neon tube indicator lamp 106 to flash which gives a visual indication of the in-phase condition. One terminal of the lamp 106 is connected to the positive supply source 108.

Should the recorder slip out of phase, the positive bias across the capacitor 94 will leak off. This will cut off the tube 54 and open the relay 49. The neon lamp indicator 106 will stop flashing and the circuit will automatically start to rephase if the switches 74, 58 and 99 remain in the position shown in the drawing for these switches. Normally, however, when the recorder 12 is phased these phasing switches will be moved to the recording position marked "PX" on the drawing. The phasing switch 99 will be ineffective at this time since the switch 26 is in the receive position.

As stated previously, the equipment shown in the drawing may serve as a transmitter of image signals, and when operating in this manner the transmit-receive switches will be placed on the T contacts. The apparatus designated by reference character 12 will function to generate image signals in accordance with the scanning of a piece of subject copy when image signals are to be transmitted. The switch 31 will place a positive bias from a source 109 on the grid 32 of the tube 33 so that this tube will remain conducting and will draw current from the source 57 through the relay coil 52 and the switch 58, the phasing switches being initially in the phase position. The relay coil 52 will be energized for each revolution of the commutator 38 when the segment 41 comes in contact with the brush 36. The relay tongue 112 and a cooperating front contact 114 will be closed for each energization of the relay thus keying a transmitter 116 with a clean phasing signal regardless of the subject copy on the scanning drum, or an equivalent subject copy holder, in the transmitter scanner which may be included in the scanning apparatus 12. After a reasonable interval the phasing switches will be moved to their PX position thus connecting the output of the transmitter scanner 12 to the transmitter 116 over a connection 119.

It will be understood that the system shown illustratively is not limited to operating the receiving motor at higher than normal speeds to effect auto-phasing. The motor could be slowed down equally as well.

Having now described the invention, what is claimed and desired to be secured by Letters Patent is the following:

1. In a facsimile system, a scanner having a moving part to be operated co-phaseally with the moving part of another scanner, a frequency responsive driving motor for said moving part, a substantially constant frequency power source for said motor to provide substantially constant speed, switching means operated by said motor, signal responsive means in series with said switching means, a relay responsive to simultaneous closure of said switching means and operation of said signal responsive means to alter the frequency of said source.

2. In a facsimile system, a scanner having a moving part to be operated co-phaseally with the moving part of another scanner, a frequency responsive driving motor for said moving part, a substantially constant frequency power source for said motor to provide substantially constant speed, switching means operated by said motor, a thermionic tube in series with said switching means, said tube having a control electrode, means to provide phasing signals on said control electrode to cause said tube to be conductive for the duration of the phasing signal, a relay responsive to simultaneous closure of said switching means and conductivity in said tube to alter the frequency of said source.

3. In a facsimile system, a scanner having a moving part to be operated co-phaseally with the moving part of another scanner, a frequency responsive driving motor for said moving part, a substantially constant frequency power source for said motor to provide substantially constant speed operation thereof, periodically operating switch means driven from said motor, an electron tube in series with said switch means, signal control means for said electron tube, means to provide said signal control means with phasing signals, and means responsive to a lack of co-ordination of said electron tube conductive times and said switch means to alter the frequency of said power source.

4. In a facsimile system, a scanner having a moving part to be operated co-phaseally with the moving part of another scanner, a frequency responsive driving motor for said moving part, a substantially constant frequency power source for said motor to provide substantially constant speed operation thereof, a frequency divider interposed between said motor and said power source, periodically operating switch means driven from said motor, an electron tube in series with said switch means, signal control means for said electron tube, means to provide said signal control means with phasing signals, means responsive to a lack of co-ordination of said electron tube conductive times and said switch means to alter the frequency dividing scale of the divider, and means responsive to the restoration of co-ordination of said electron tube conductive times and said switch means to restore the frequency dividing scale of the divider.

5. A phasing system for a drive mechanism comprising a frequency responsive motor which is to be operated in phase with another motor, a standard frequency source for supplying driving power to said motor, periodically operating switch means driven from said motor, an electron tube in series with said switch means, signal control means for said electron tube, means to provide said signal control means with phasing signals, a relay having an operating winding in connected series with said switch means and said electron tube through a pair of relay contacts which are closed when said coil is de-energized, a second electron tube, contacts on said relay for connecting said second electron tube to said relay operating coil, said contacts being closed upon energization of said relay in response to co-phaseal operation of said motor, said second named electron tube having a control electrode, and means comprising a time constant circuit for maintaining said second electron tube conductive during co-phaseal operation of said motor.

CHARLES N. GILLESPIE.

REFERENCES CITED

The following references are of record in the file of this patent:

UNITED STATES PATENTS

| Number | Name | Date |
|---|---|---|
| 2,234,919 | Ressler | Mar. 11, 1941 |
| 2,359,649 | Kahn | Oct. 3, 1944 |
| 2,399,421 | Artzt | Apr. 30, 1946 |
| 2,404,571 | Finch | July 23, 1946 |